United States Patent
Naganuma et al.

(10) Patent No.: US 9,425,473 B2
(45) Date of Patent: Aug. 23, 2016

(54) FUEL CELL SYSTEM AND METHOD OF OPERATING FUEL CELL SYSTEM

(75) Inventors: Yoshiaki Naganuma, Toyota (JP);
Keigo Suematsu, Toyota (JP);
Tomotaka Ishikawa, Aichi-gun (JP);
Hiroyuki Katsuda, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1267 days.

(21) Appl. No.: 13/382,564

(22) PCT Filed: Jul. 9, 2009

(86) PCT No.: PCT/JP2009/062539
§ 371 (c)(1),
(2), (4) Date: Jan. 6, 2012

(87) PCT Pub. No.: WO2011/004485
PCT Pub. Date: Jan. 13, 2011

(65) Prior Publication Data
US 2012/0100445 A1    Apr. 26, 2012

(51) Int. Cl.
*H01M 8/04* (2016.01)

(52) U.S. Cl.
CPC ...... *H01M 8/04746* (2013.01); *H01M 8/04552* (2013.01); *H01M 8/04701* (2013.01); *H01M 8/04828* (2013.01); *Y02E 60/50* (2013.01)

(58) Field of Classification Search
CPC ..................................................... H01M 8/04
See application file for complete search history.

(56) References Cited

U.S. PATENT DOCUMENTS

| 2006/0286418 | A1* | 12/2006 | Saeki et al. ............ 429/22 |
| 2008/0292928 | A1* | 11/2008 | Cherchi et al. ......... 429/23 |
| 2010/0323260 | A1 | 12/2010 | Imamura et al. |

FOREIGN PATENT DOCUMENTS

| JP | 2002-260704 A | 9/2002 |
| JP | 2002-305017 A | 10/2002 |
| JP | 2002-352827 A | 12/2002 |
| JP | 2003-217624 A | 7/2003 |
| JP | 2004-335444 A | 11/2004 |
| JP | 2005-063712 A | 3/2005 |
| JP | 2005-158596 A | 6/2005 |
| JP | 2005-209635 A | 8/2005 |
| JP | 2007-184136 A | 7/2007 |
| JP | 2007280892 A | 10/2007 |
| JP | 2008-146971 A | 6/2008 |
| JP | 2008-166018 A | 7/2008 |
| JP | 2008288148 A | 11/2008 |
| JP | 2008-305696 A | 12/2008 |
| WO | 2008142564 A1 | 11/2008 |

OTHER PUBLICATIONS

International Search Report mailed Aug. 11, 2009 of PCT/JP2009/062539.

* cited by examiner

*Primary Examiner* — Jacob Marks
(74) *Attorney, Agent, or Firm* — Kenyon & Kenyon LLP

(57) ABSTRACT

The invention is provided to reliably restore generated voltage that has declined due to clogging of water in a fuel cell stack. A method of operating a fuel cell system having a fuel cell stack that generates electricity through an electrochemical reaction between a fuel gas including hydrogen gas and an oxidation gas, wherein when a generated voltage of the fuel cell stack declines, the water-in-cell content of the fuel cell stack is adjusted so that a variation in cell pressure loss in the fuel cell stack decreases based on a characteristic curve of the water-in-cell content of the fuel cell stack and the cell pressure loss of the fuel cell stack.

5 Claims, 10 Drawing Sheets

FUEL CELL SYSTEM AND METHOD OF OPERATING FUEL CELL SYSTEM

This is a 371 national phase application of PCT/JP2009/062539 filed 9 Jul. 2009, the contents of which are incorporated herein by reference.

The present invention relates to a fuel cell system and a method of operating a fuel cell system.

BACKGROUND ART

For example, a fuel cell system mounted to a vehicle such as an automobile as a drive source comprises a fuel cell that generates electricity through an electrochemical reaction between a fuel gas including hydrogen gas and an oxidation gas. The fuel cell has a stack structure in which a plurality of cells is laminated.

During an operation of the fuel cell system, for example, a portion of water produced by an electrochemical reaction in the fuel cell stack penetrates into a cell. When a water content in the cell increases excessively and the cell becomes clogged by water, there may be cases where gas is unable to travel through the cell and a gas supply deviates from stoichiometry, resulting in a decrease in generated voltage.

Therefore, clogging of water in a cell of a fuel cell stack is detected and the detected water in the cell is discharged by increasing a purge volume (refer to Patent Document 1).

Patent document 1: Patent Publication JP-A-2002-260704
Patent document 2: Patent Publication JP-A-2005-63712
Patent document 3: Patent Publication JP-A-2007-184136
Patent document 4: Patent Publication JP-A-2003-217624

However, there may be cases where simply increasing a purge volume as described above does not restore generated voltage. This is conceivably due to the fact that purging and reducing water content may result in a greater variation in cell pressure loss among cells in a fuel cell stack, in which case gas is not sufficiently supplied to a cell with a greatest relative pressure loss and electricity is not generated efficiently.

SUMMARY

The present invention has been made in consideration of the above, and an object thereof is to provide a fuel cell system and a method of operating a fuel cell system capable of reliably restoring generated voltage that has declined due to clogging of water in a fuel cell stack.

In order to achieve the object described above, the present invention is a fuel cell system having a fuel cell stack that generates electricity through an electrochemical reaction between a fuel gas including hydrogen gas and an oxidation gas, the fuel cell system having water-in-cell content adjusting means for adjusting, when a generated voltage of the fuel cell stack declines, a water-in-cell content of the fuel cell stack so that a variation in cell pressure loss in the fuel cell stack decreases based on a characteristic curve of the water-in-cell content of the fuel cell stack and the cell pressure loss of the fuel cell stack. Moreover, a decline in the generated voltage of the fuel cell stack is not limited to a decline in a generated voltage of an entire fuel cell stack and also includes a decline in a generated voltage of each cell in the fuel cell stack.

According to the present invention, since a variation in the cell pressure loss in the fuel cell stack can be reduced, gas can be supplied in a proper amount of gas supply stoichiometry to all cells in the fuel cell stack and, as a result, generated voltage can be reliably restored.

In a case where the characteristic curve includes a transition from a stable section, in which the cell pressure loss of the fuel cell stack increases relatively moderately, to a steep increase section, in which the cell pressure loss of the fuel cell stack increases relatively steeply, with respect to an increase in the water-in-cell content of the fuel cell stack, the water-in-cell content adjusting means may adjust the water-in-cell content of the fuel cell stack to be decreased when the generated voltage of the fuel cell stack declines. In such a case, the water-in-cell content of the fuel cell stack can be reduced to restore the cell pressure loss of each cell in the fuel cell stack to the stable section. Consequently, a variation in the cell pressure loss in the fuel cell stack can be reduced and generated voltage can be restored.

In a case where the characteristic curve includes a transition from a stable section, in which the cell pressure loss of the fuel cell stack decreases relatively moderately, to a steep decrease section, in which the cell pressure loss of the fuel cell stack decreases relatively steeply, with respect to a decrease in the water-in-cell content of the fuel cell stack, the water-in-cell content adjusting means may adjust the water-in-cell content of the fuel cell stack is adjusted to increase when the generated voltage of the fuel cell stack declines. In such a case, the water-in-cell content of the fuel cell stack can be increased to restore the cell pressure loss of each cell in the fuel cell stack to the stable section. Consequently, a variation in the cell pressure loss in the fuel cell stack can be reduced and generated voltage can be restored.

In a case where the characteristic curve includes a transition from a stable section, in which the cell pressure loss of the fuel cell stack increases relatively moderately, to a steep increase section, in which the cell pressure loss of the fuel cell stack increases relatively steeply, with respect to an increase in the water-in-cell content of the fuel cell stack and a transition from the stable section, in which the cell pressure loss of the fuel cell stack decreases relatively moderately, to a steep decrease section, in which the cell pressure loss of the fuel cell stack decreases relatively steeply, with respect to a decrease in the water-in-cell content of the fuel cell stack, the water-in-cell content adjusting means may adjust, when the generated voltage of the fuel cell stack declines, the water-in-cell content of the fuel cell stack to be decrease if an average water-in-cell content of the fuel cell stack is in the stable section or the steep increase section and adjust the water-in-cell content of the fuel cell stack to be increased if the average water-in-cell content of the fuel cell stack is in the steep decrease section. In such a case, the water-in-cell content of the fuel cell stack can be reduced or increased to restore the cell pressure loss of each cell in the fuel cell stack to the stable section. Consequently, a variation in the cell pressure loss in the fuel cell stack can be reduced and generated voltage can be restored.

In the fuel cell system described above, the adjustment of the water-in-cell content of the fuel cell stack may be performed by at least any of an adjustment of a purge volume of the fuel cell stack, an adjustment of a gas back pressure of the fuel cell stack, and an adjustment of a temperature of the fuel cell stack.

The present invention according to another aspect is a method of operating a fuel cell system having a fuel cell stack that generates electricity through an electrochemical reaction between a fuel gas including hydrogen gas and an oxidation gas, the method of operating a fuel cell system comprising adjusting, when a generated voltage of the fuel cell stack declines, a water-in-cell content of the fuel cell stack so that a variation in cell pressure loss in the fuel cell stack decreases based on a characteristic curve of the water-in-cell content of the fuel cell stack and the cell pressure loss of the fuel cell stack.

According to the present invention, since a variation in the cell pressure loss in the fuel cell stack is reduced, gas can be supplied in a proper amount of gas supply stoichiometry to all cells in the fuel cell stack and, as a result, generated voltage can be reliably restored.

In the method of operating the fuel cell system described above, in a case where the characteristic curve includes a transition from a stable section, in which the cell pressure loss of the fuel cell stack increases relatively moderately, to a steep increase section, in which the cell pressure loss of the fuel cell stack increases relatively steeply, with respect to an increase in the water-in-cell content of the fuel cell stack, the water-in-cell content of the fuel cell stack may be adjusted to decrease when the generated voltage of the fuel cell stack declines. In such a case, the water-in-cell content of the fuel cell stack can be reduced to restore the cell pressure loss of each cell in the fuel cell stack to the stable section. Consequently, a variation in the cell pressure loss in the fuel cell stack can be reduced and generated voltage can be restored.

In the method of operating the fuel cell system described above, in a case where the characteristic curve includes a transition from a stable section, in which the cell pressure loss of the fuel cell stack decreases relatively moderately, to a steep decrease section, in which the cell pressure loss of the fuel cell stack decreases relatively steeply, with respect to a decrease in the water-in-cell content of the fuel cell stack, the water-in-cell content of the fuel cell stack may be adjusted to increase when the generated voltage of the fuel cell stack declines. In such a case, the water-in-cell content of the fuel cell stack can be increased to restore the cell pressure loss of each cell in the fuel cell stack to the stable section. Consequently, a variation in the cell pressure loss in the fuel cell stack can be reduced and generated voltage can be restored.

In the method of operating the fuel cell system described above, in a case where the characteristic curve includes a transition from a stable section, in which the cell pressure loss of the fuel cell stack increases relatively moderately, to a steep increase section, in which the cell pressure loss of the fuel cell stack increases relatively steeply, with respect to an increase in the water-in-cell content of the fuel cell stack and a transition from the stable section, in which the cell pressure loss of the fuel cell stack decreases relatively moderately, to a steep decrease section, in which the cell pressure loss of the fuel cell stack decreases relatively steeply, with respect to a decrease in the water-in-cell content of the fuel cell stack, when the generated voltage of the fuel cell stack declines, the water-in-cell content of the fuel cell stack may be adjusted to decrease if an average water-in-cell content of the fuel cell stack is in the stable section or the steep increase section and the water-in-cell content of the fuel cell stack may be adjusted so as to increase if the average water-in-cell content of the fuel cell stack is in the steep decrease section. In such a case, the water-in-cell content of the fuel cell stack can be reduced or increased to restore the cell pressure loss of each cell in the fuel cell stack to the stable section. Consequently, a variation in the cell pressure loss in the fuel cell stack can be reduced and generated voltage can be restored.

The adjustment of the water content of the fuel cell stack may be performed by at least any of an adjustment of a purge volume of the fuel cell stack, an adjustment of a gas back pressure of the fuel cell stack, and an adjustment of a temperature of the fuel cell stack.

According to the present invention, when generated voltage of a fuel cell stack declines due to clogging of water in the fuel cell stack, the generated voltage can be reliably restored.

DETAILED DESCRIPTION

Figure 1:
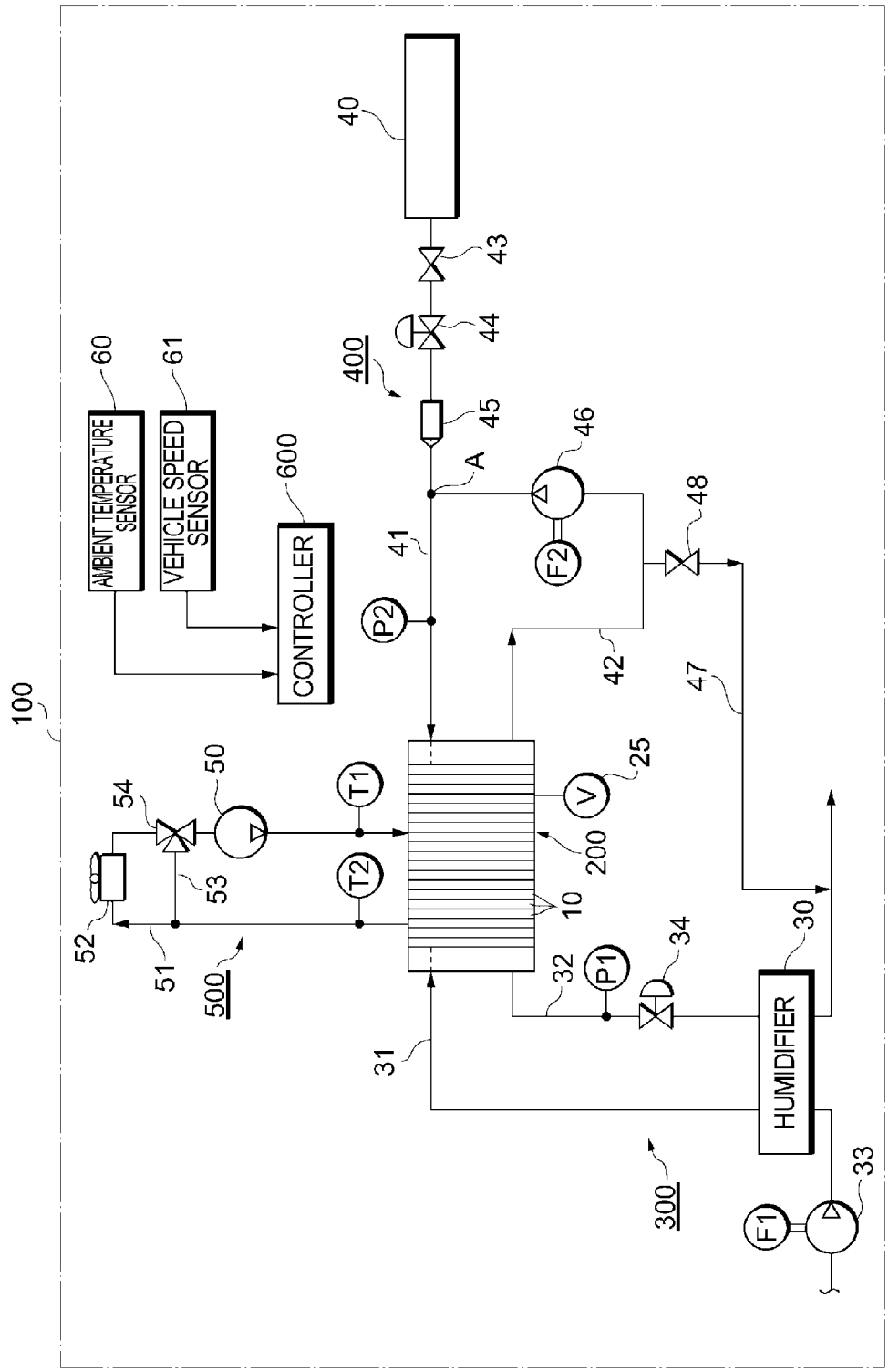
FIG. 1 is a schematic diagram showing an outline of a configuration of a fuel cell system.

Hereinafter, a preferred embodiment of the present invention will be described with reference to the drawings. FIG. 1 is a schematic diagram showing an outline of a configuration of a fuel cell system 100 on which a method of operating a fuel cell system according to the present embodiment is performed.

For example, the fuel cell system 100 comprises a fuel cell stack 200, an air piping system 300, a hydrogen piping system 400, a cooling medium piping system 500, and a controller 600. The fuel cell system 100 can be mounted on various mobile objects such as a vehicle, a ship, an airplane, and a robot, and can also be applied to a stationary power source. Here, an example of the fuel cell system 100 mounted on an automobile will be described.

Figure 2:
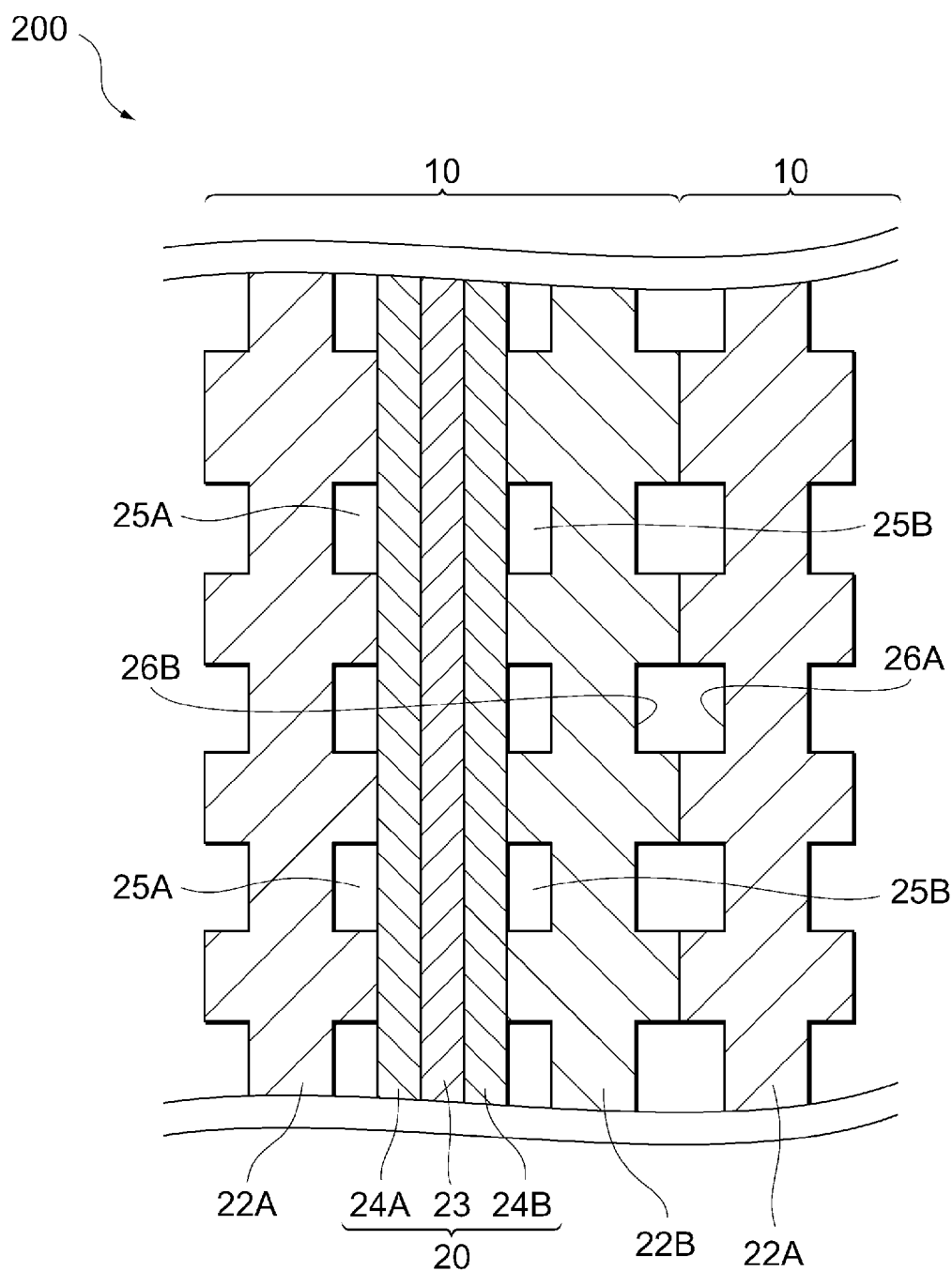
FIG. 2 is an explanatory diagram of a longitudinal cross section showing a configuration of a cell of a fuel cell stack.

The fuel cell stack 200 has a stack structure in which a plurality of polymer electrolyte cells 10 is laminated. As shown in FIG. 2, the cell 10 comprises an MEA 20 and a pair of separators 22A and 22B. The MEA 20 (membrane-electrode assembly) comprises an electrolyte membrane 23 made of an ion-exchange membrane, and an anode electrode 24A and a cathode electrode 24B which sandwich the electrolyte membrane 23. A hydrogen flow channel 25A of the separator 22A faces the electrode 24A and an air flow channel 25B of the separator 22B faces the electrode 24B. In addition, cooling medium flow channels 26A and 26B of the separators 22A and 22B travel between adjacent single cells 10. Moreover, the amount of water contained in the cell 10 is considered to be a water-in-cell content of the fuel cell stack 200. In addition, as shown in FIG. 1, the fuel cell stack 200 is provided with a voltmeter 25 capable of measuring a generated voltage of each cell of the fuel cell stack 200.

The air piping system 300 supplies air as an oxidation gas to and discharges air from the fuel cell stack 200, and comprises a humidifier 30, a supply flow channel 31, an exhaust flow channel 32, and a compressor 33. Ambient air (air in a low moisture state) is taken in by the compressor 33 and pressure-fed to the humidifier 30. Moisture exchange between the air and an oxidation offgas in a high moisture state is performed at the humidifier 30. As a result, moderately humidified air is supplied from the supply flow channel 31 to the fuel cell stack 200. A back pressure valve 34 for adjusting an air back pressure of the fuel cell stack 200 is provided in the exhaust flow channel 32. In addition, a pressure sensor P1 that detects an air back pressure is provided in a vicinity of the back pressure valve 34. A flow rate sensor F1 that detects an air supply flow rate to the fuel cell stack 200 is provided at the compressor 33.

The hydrogen piping system 400 supplies hydrogen gas as a fuel gas to and discharges hydrogen gas from the fuel cell stack 200, and comprises a hydrogen supply source 40, a supply flow channel 41, a circulation flow channel 42, a shut valve 43, a regulator 44, an injector 45, and the like. The hydrogen gas from the hydrogen supply source 40 is decompressed by the regulator 44 and is then subjected to high-precision adjustment of a flow rate and pressure by an injector 45. Subsequently, the hydrogen gas joins a hydrogen offgas pressure-fed by a hydrogen pump 46 as a gas circulator on the circulation flow channel 42 at a confluence A to be supplied to the fuel cell stack 200. A purge channel 47 including a purge valve 48 is branched and connected to the circulation flow channel 42. By opening the purge valve 48, a hydrogen offgas is discharged to the exhaust flow channel 32. A pressure sensor P2 that detects a supply pressure of hydrogen gas to the fuel cell stack 200 is provided downstream of the confluence A of the supply flow channel 41. In addition, a flow rate sensor F2 is provided at the hydrogen pump 46. Moreover, in other embodiments, a fuel offgas may be introduced into a hydrogen diluter or the like or a gas-liquid separator may be provided in the circulation flow channel 42.

The cooling medium piping system 500 circulates and supplies a cooling medium (for example, cooling water) to the fuel cell stack 200, and comprises a cooling pump 50, a cooling medium flow channel 51, a radiator 52, a bypass flow channel 53, and a changeover valve 54. The cooling pump 50 pressure-feeds a cooling medium in the cooling medium flow channel 51 into the fuel cell stack 200. The cooling medium flow channel 51 comprises a temperature sensor T1 positioned at a cooling medium inlet of the fuel cell stack 200 and a temperature sensor T2 positioned at a cooling medium outlet of the fuel cell stack 200. The radiator 52 cools a cooling medium discharged from the fuel cell stack 200. The changeover valve 54 comprises a rotary valve or the like and, when necessary, switches over conduction of the cooling medium between the radiator 52 and the bypass flow channel 53.

The controller 600 is configured as a microcomputer internally comprising a CPU, a ROM, and a RAM. Information detected by the sensors (P1, P2, F1, F2, T1, and T2) which detect pressure, a temperature, a flow rate, and the like of fluids flowing through the respective piping systems 300, 400, and 500 is inputted to the controller 600. Furthermore, in addition to information detected by the voltmeter 25 that measures a generated voltage of each cell in the fuel cell stack 200, information detected by an ambient temperature sensor 60, a vehicle speed sensor 61, an accelerator opening sensor, and the like is inputted to the controller 600. In accordance with the detected information and the like, the controller 600 controls the various devices (the compressor 33, the shut valve 43, the injector 45, the hydrogen pump 46, the purge valve 48, the cooling pump 50, the changeover valve 54, and the like) in the fuel cell system 100 and integrally controls operations of the fuel cell system 100. In addition, the controller 600 reads various types of detected information and adjusts a water-in-cell content of the fuel cell stack 200 using information on a characteristic curve P (to be described later) stored in the ROM.

Figure 3:
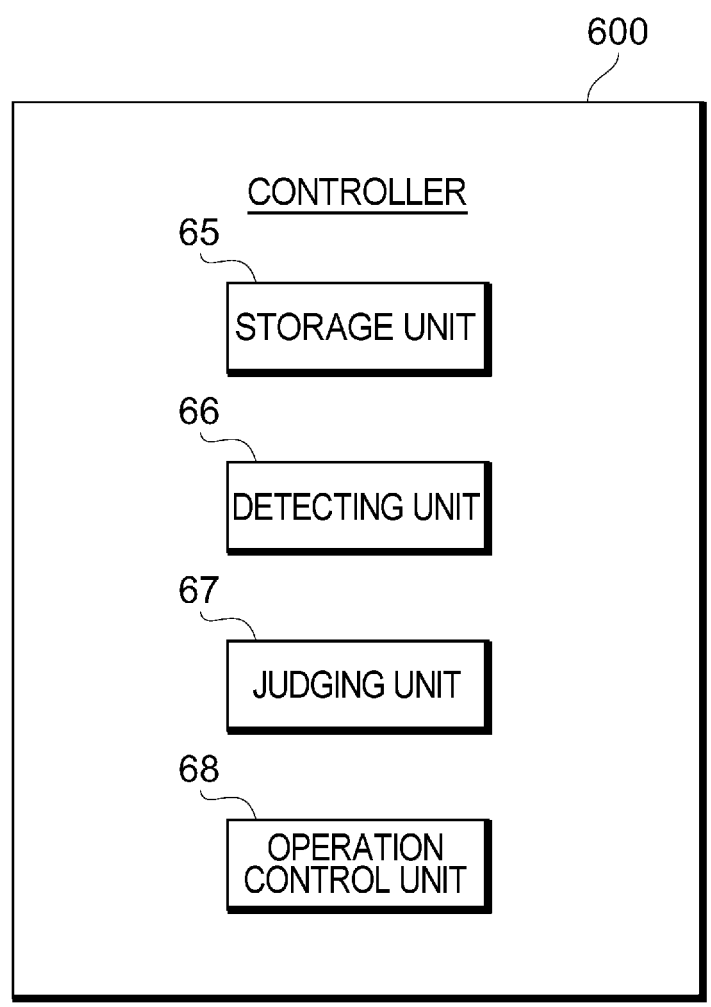
FIG. 3 is a block diagram of a controller.

As shown in FIG. 3, the controller 600 comprises a storage unit 65, a detecting unit 66, a judging unit 67, and an operation control unit 68 as function blocks for adjusting a water-in-cell content of the fuel cell stack 200. The storage unit 65 stores various programs for adjusting the water-in-cell content of the fuel cell stack 200 and information on the characteristic curve P. The detecting unit 66 reads information detected by various sensors (P1, P2, F1, F2, T1, T2, 25, 60, and 61) and the like. The judging unit 67 judges, for example, whether or not a minimum cell generated voltage of the cell 10 of the fuel cell stack 200 has dropped below a threshold set in advance. Based on a judgment result by the judging unit 67, the operation control unit 68 transmits a control order to each device and controls operations so that the fuel cell stack 200 achieves a desired water content.

Based on a judgment made by the judging unit 67, the operation control unit 68 adjusts a water-in-cell content of the fuel cell stack 200 using information on the characteristic curve P stored in the storage unit 65. Specifically, a water-in-cell content is adjusted by: an adjustment of a purge volume of the fuel cell stack 200 performed by adjusting an amount of offgas supplied by the hydrogen pump 46 shown in FIG. 1, adjusting an amount of hydrogen gas supplied by the injector 45, adjusting an amount of air supplied by the compressor 33, or the like; an adjustment of a gas back pressure of the fuel cell stack 200 performed by adjusting the back pressure valve 34 or the like; an adjustment of a temperature of the fuel cell stack 200 by controlling a cooling medium temperature of the cooling medium piping system 500, and the like. Moreover, in the present embodiment, the water-in-cell content adjusting means comprises at least any of the hydrogen pump 46, the injector 45, the compressor 33, the back pressure valve 34, and the cooling medium piping system 500, and the controller 600.

Next, a description will be given of a method of operating the fuel cell system 100 configured as described above.

During an operation of the fuel cell system 100, there may be cases where water produced by an electrochemical reaction between hydrogen gas and air accumulates excessively in the cell 10 of the fuel cell stack 200, and as clogging of water occurs, a gas supply deviates from stoichiometry and causes a decline in generated voltage In the method of operating the fuel cell system 100 according to the present embodiment, when a generated voltage of the fuel cell stack 200 declines, the generated voltage is restored by adjusting the water-in-cell content of the fuel cell stack 200 so that a variation in cell pressure loss in the fuel cell stack 200 decreases based on a characteristic curve P of the water-in-cell content of the fuel cell stack 200 and the cell pressure loss of the fuel cell stack 200. In this case, cell pressure loss refers to a pressure loss with respect to supply gas at each cell.

Figure 4:
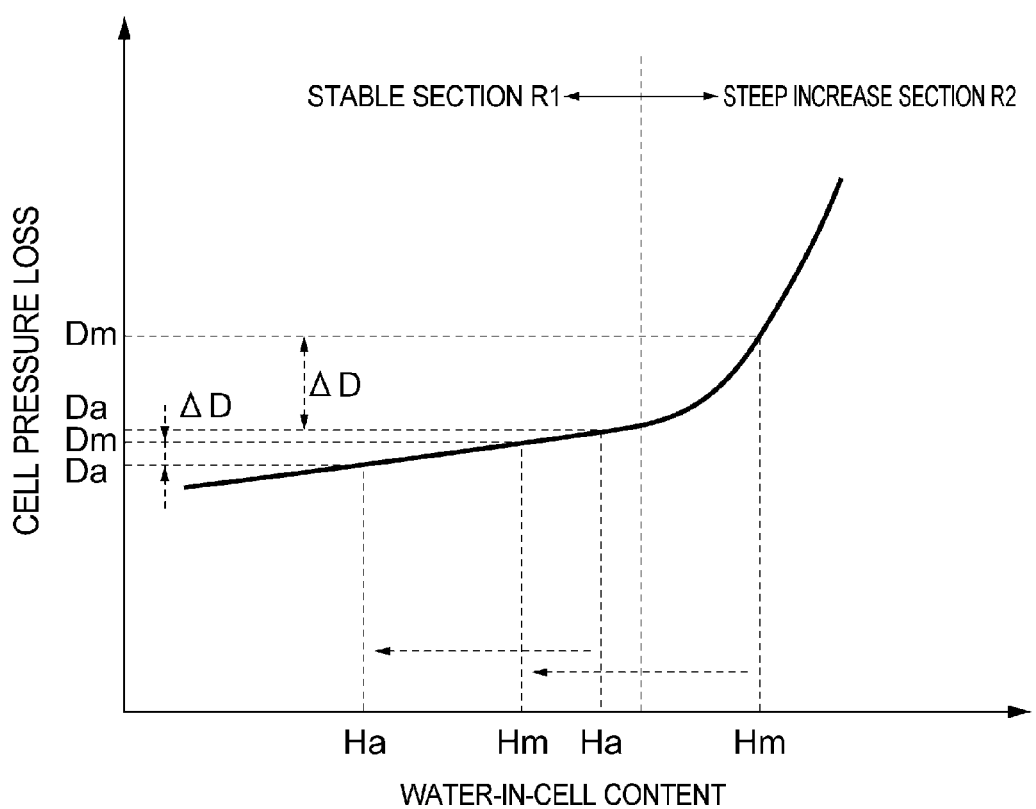
FIG. 4 is a graph showing a characteristic curve of a pattern 1.
Figure 5:
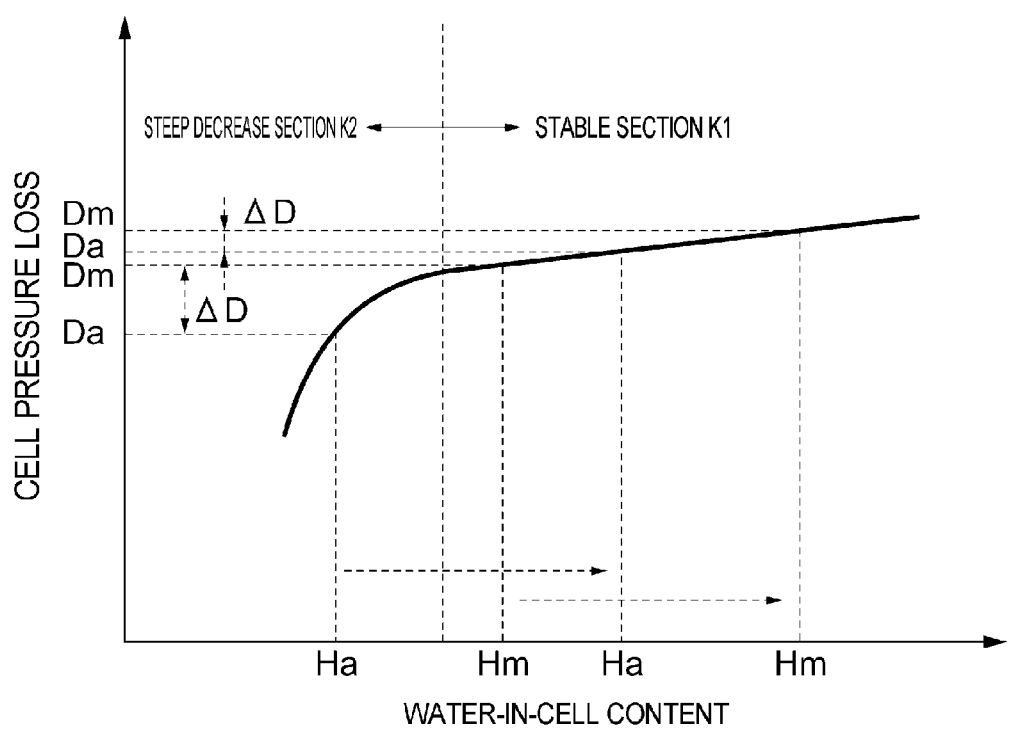
FIG. 5 is a graph showing a characteristic curve of a pattern 2.
Figure 6:
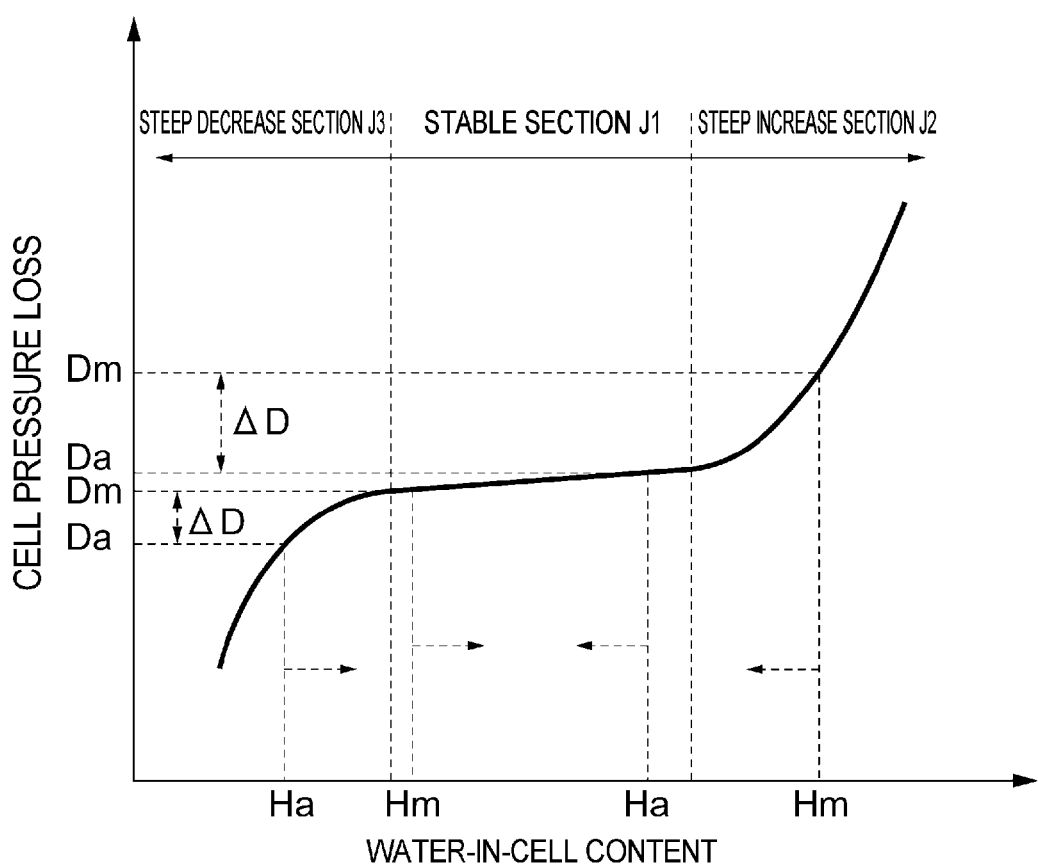
FIG. 6 is a graph showing a characteristic curve of a pattern 3.

The characteristic curve P has three patterns. As shown in FIG. 4, a pattern P1 of the characteristic curve P represents a transition from a stable section R1 in which a cell pressure loss of the fuel cell stack 200 increases relatively moderately to a steep increase section R2 in which the cell pressure loss of the fuel cell stack 200 increases relatively steeply with respect to an increase in the water-in-cell content of the fuel cell stack 200. As shown in FIG. 5, a pattern P2 of the characteristic curve P represents a transition from a stable section K1 in which a cell pressure loss of the fuel cell stack 200 decreases relatively moderately to a steep decrease section K2 in which the cell pressure loss of the fuel cell stack 200 decreases relatively steeply with respect to a decrease in the water-in-cell content of the fuel cell stack 200. As shown in FIG. 6, a pattern P3 of the characteristic curve P represents a transition from a stable section J1 in which a cell pressure loss of the fuel cell stack 200 increases relatively moderately to a steep increase section J2 in which the cell pressure loss of the fuel cell stack 200 increases relatively steeply with respect to an increase in the water-in-cell content of the fuel cell stack 200, and a transition from the stable section J1 in which the cell pressure loss of the fuel cell stack 200 decreases relatively moderately to a steep decrease section J3 in which the cell pressure loss of the fuel cell stack 200 decreases relatively steeply with respect to a decrease in the water-in-cell content of the fuel cell stack 200. Information on the characteristic curves P is obtained in advance by an experiment or the like and is stored in the storage unit 65.

Hereinafter, a method of operating the fuel cell system 100 with respect to the respective patterns P1, P2, and P3 of the characteristic curve P will be specifically described.

Figure 7:
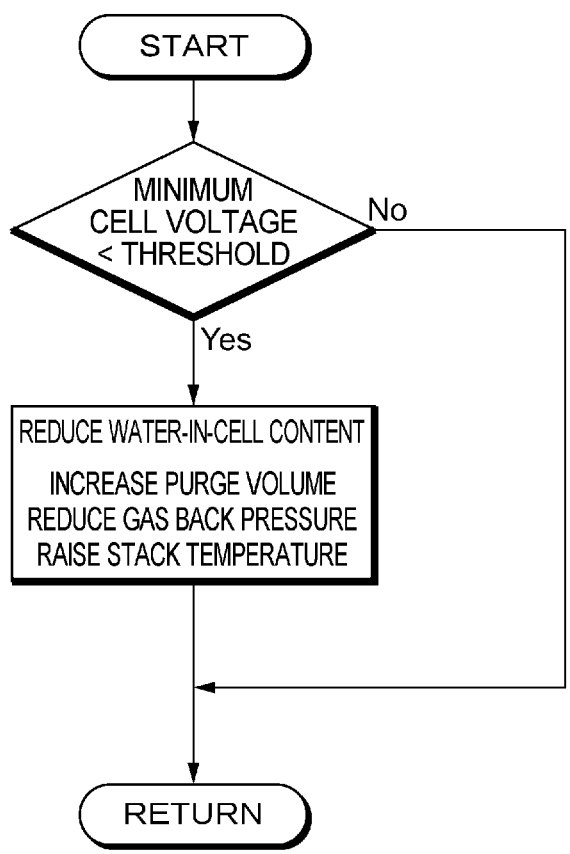
FIG. 7 is a flow chart of a method of operating a fuel cell system in a case of the characteristic curve of the pattern 1.

First, a case of the pattern P1 will be described. A flow chart in this case is shown in FIG. 7. For example, a minimum cell voltage generated by the fuel cell stack 200 is monitored by the voltmeter 25, and when the minimum cell voltage drops below a predetermined threshold, a water-in-cell content of the fuel cell stack 200 is reduced. A reduction of the water-in-cell content is performed by, for example, increasing a purge volume of the fuel cell stack 200, reducing a gas back pressure of the fuel cell stack 200, raising a temperature of the fuel cell stack 200, and the like. Consequently, as shown in FIG. 4, for example, since an average water-in-cell content Ha (an average water content of all cells 10) and a maximum water-in-cell content Hm (a maximum water content among all cells 10) of the fuel cell stack 200 make transitions from the steep increase section R2 to the stable section R1, a variation in cell pressure loss decreases. In other words, for example, a difference ΔD between an average cell pressure loss Da (an average pressure loss of all cells 10) and a maximum cell pressure loss Dm (a maximum power loss among all cells 10) is reduced. Since a gas supply stoichiometry to the fuel cell stack 200 is determined from the average cell pressure loss Da and the maximum cell pressure loss Dm, a decline in the difference ΔD enables a proper amount of gas to be stably supplied to all cells 10.

Figure 8:
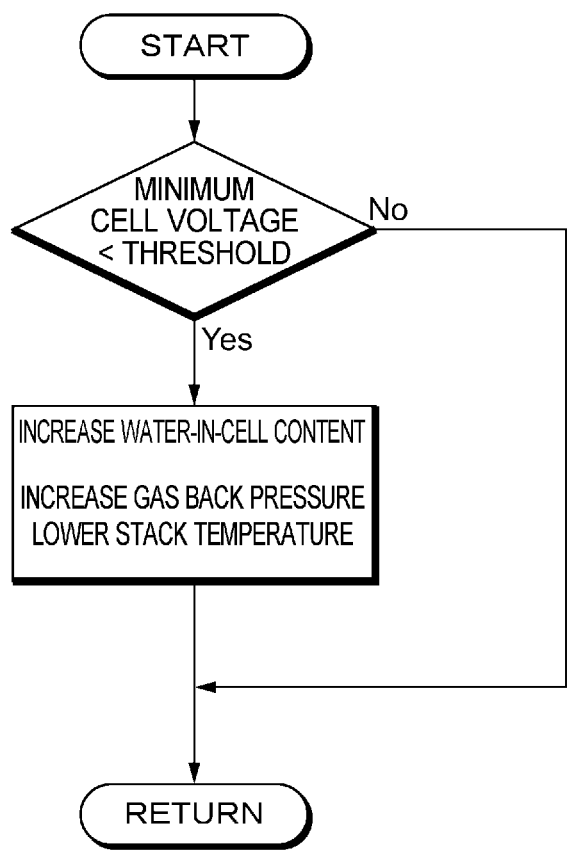
FIG. 8 is a flow chart of a method of operating a fuel cell system in a case of the characteristic curve of the pattern 2.

Next, a case of the pattern P2 will be described. A flow chart in this case is shown in FIG. 8. For example, a minimum cell voltage generated by the fuel cell stack 200 is monitored by the voltmeter 25, and when the minimum cell voltage drops below a predetermined threshold, a water-in-cell content of the fuel cell stack 200 is increased. An increase of the water-in-cell content is achieved by, for example, increasing a gas back pressure of the fuel cell stack 200, lowering a temperature of the fuel cell stack 200, and the like. Consequently, as shown in FIG. 5, for example, since an average water-in-cell content Ha and a maximum water-in-cell content Hm of the fuel cell stack 200 make transitions from the steep decrease section K2 to the stable section K1, a variation in cell pressure loss decreases. In other words, for example, a difference ΔD between an average cell pressure loss Da and a maximum cell pressure loss Dm is reduced. As described earlier, since a gas supply stoichiometry is determined from the average cell pressure loss Da and the maximum cell pressure loss Dm, a decline in the difference ΔD enables a proper amount of gas to be stably supplied to all cells 10.

Figure 9:
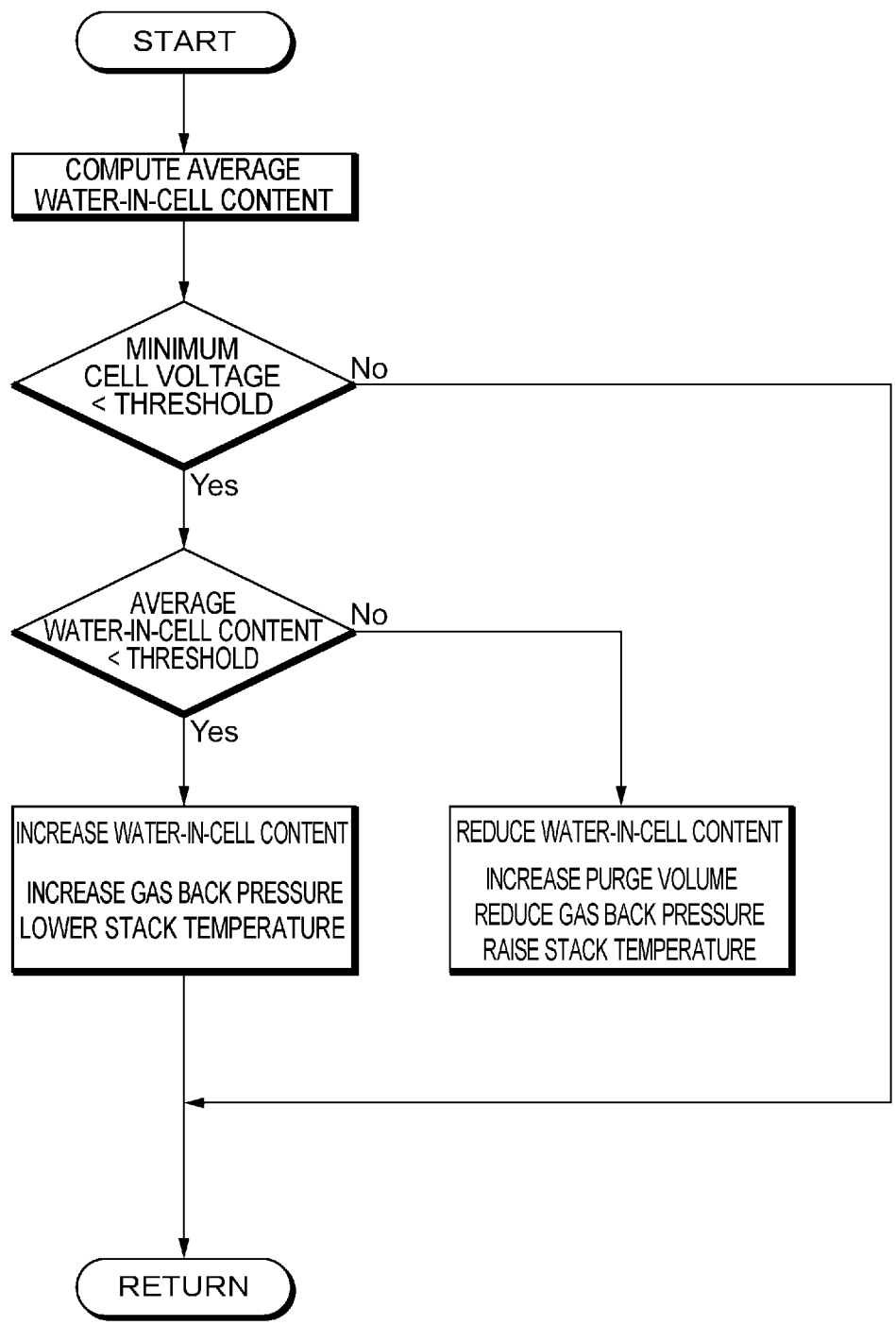
FIG. 9 is a flow chart of a method of operating a fuel cell system in a case of the characteristic curve of the pattern 3.
Figure 10:
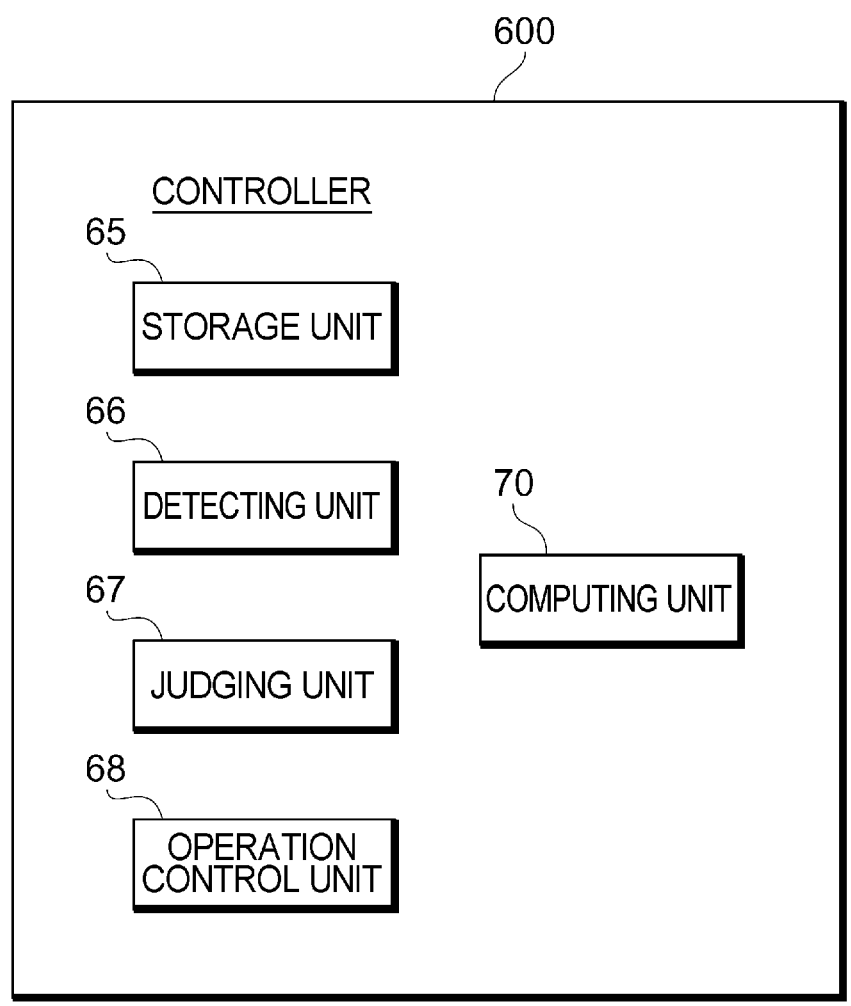
FIG. 10 is a block diagram of a controller comprising a computing unit.

Next, a case of the pattern P3 will be described. A flow chart in this case is shown in FIG. 9. First, an average water-in-cell content Ha is calculated. The calculation of the average water-in-cell content Ha is performed by, for example, the computing unit 70 provided in the controller 600 as shown in FIG. 10. The average water-in-cell content Ha is obtained by measuring a direct-current resistance of the entire fuel cell stack 200 and from a resistance value thereof, or by calculating a water balance of the fuel cell stack 200 from an amount of generated water of the fuel cell stack 200 obtained from a gas supply or an amount of water vapor of a cathode offgas.

In addition, when a minimum cell voltage generated by the fuel cell stack 200 is monitored by the voltmeter 25 and the minimum cell voltage drops below a predetermined threshold, a judgment is made on whether the average water-in-cell content Ha is in the stable section J1, the steep increase section J2, or the steep decrease section J3 shown in FIG. 6. The judgment is performed based on whether or not the average water-in-cell content Ha is higher than a boundary value of the stable section J1 and the steep decrease section J3 on the characteristic curve P3.

Next, when the average water-in-cell content Ha equals or exceeds the threshold and is in the stable section J1 or the steep increase section J2 as shown in FIG. 9, the water-in-cell content of the fuel cell stack 200 is reduced. A reduction of the water-in-cell content is performed by, for example, increasing a purge volume of the fuel cell stack 200, reducing a gas back pressure of the fuel cell stack 200, raising a temperature of the fuel cell stack 200, and the like. Consequently, as shown in FIG. 6, for example, since an average water-in-cell content Ha and a maximum water-in-cell content Hm of the fuel cell stack 200 make transitions from the steep increase section J2 to the stable section J1, a variation in cell pressure loss decreases. In other words, for example, a difference ΔD between an average cell pressure loss Da and a maximum cell pressure loss Dm decreases. As described earlier, since a gas supply stoichiometry is determined from the average cell pressure loss Da and the maximum cell pressure loss Dm, a decline in the difference ΔD enables a proper amount of gas to be stably supplied to all cells 10.

In addition, when the average water-in-cell content Ha is lower than the threshold and is in the steep decrease section J3 as shown in FIG. 9, the water-in-cell content of the fuel cell stack 200 is increased. An increase of the water-in-cell content is achieved by, for example, increasing a gas back pressure of the fuel cell stack 200, lowering a temperature of the fuel cell stack 200, and the like. Consequently, as shown in FIG. 6, for example, since an average water-in-cell content Ha and a maximum water-in-cell content Hm of the fuel cell stack 200 make transitions from the steep decrease section J3 to the stable section J1, a variation in cell pressure loss decreases. In other words, for example, a difference ΔD between an average cell pressure loss Da and a maximum cell pressure loss Dm is reduced. As described earlier, since a gas supply stoichiometry is determined from the average cell pressure loss Da and the maximum cell pressure loss Dm, a decline in the difference ΔD enables a proper amount of gas to be stably supplied to all cells 10.

According to the embodiment described above, since the water-in-cell content of the fuel cell stack 200 is adjusted based on a characteristic curve P of the water-in-cell content of the fuel cell stack 200 and the cell pressure loss of the fuel cell stack 200 and a variation of cell pressure loss in the fuel cell stack 200 is reduced, gas can be supplied in a proper amount of gas supply stoichiometry to all cells 10 in the fuel cell stack 200 and, as a result, generated voltage can be reliably restored.

In addition, in a case where the characteristic curve P is the pattern P1, since an adjustment is performed so as to reduce the water-in-cell content of the fuel cell stack 200, the cell pressure loss of the fuel cell stack 200 can be restored to the stable section R1. Consequently, a variation in the cell pressure loss in the fuel cell stack 200 can be reduced and generated voltage can be restored.

Furthermore, in a case where the characteristic curve P is the pattern P2, an adjustment is performed so as to increase the water-in-cell content of the fuel cell stack 200 and the cell pressure loss of the fuel cell stack 200 can be restored to the stable section K1. Consequently, a variation in the cell pressure loss in the fuel cell stack 200 can be reduced and generated voltage can be restored.

Moreover, in a case where the characteristic curve P is the pattern P3, a judgment is made on whether the average water-in-cell content Ha of the fuel cell stack 200 is in the stable section J1, the steep increase section J2, or the steep decrease section J3, and depending on the judgment, the water-in-cell content of the fuel cell stack 200 is reduced or increased and the cell pressure loss of the fuel cell stack 200 can be restored to the stable section J1. Consequently, a variation in the cell pressure loss in the fuel cell stack 200 can be reduced and generated voltage can be restored.

Since the adjustment of the water-in-cell content of the fuel cell stack 200 is performed by at least any of an adjustment of a purge volume of the fuel cell stack 200, an adjustment of a gas back pressure of the fuel cell stack 200, and an adjustment of a temperature of the fuel cell stack 200, the water-in-cell content can be adjusted in an easy and proper manner.

While a preferred embodiment of the present invention has been described with reference to the drawings, the present invention is not limited to such an example. It will be obvious to those skilled in the art that various changes and modifications may be made without departing from the spirit and the scope of the invention as hereinafter claimed. It is to be understood that all such changes and modifications also belong to the technical scope of the present invention.

INDUSTRIAL APPLICABILITY

The present invention is useful for reliably restoring generated voltage that has declined due to clogging of water in a fuel cell stack.

EXPLANATION OF REFERENCE NUMERALS 10 cell
100 fuel cell system
200 fuel cell stack
600 controller

We claim:

1. A fuel cell system having a fuel cell stack that generates electricity through an electrochemical reaction between a fuel gas including hydrogen gas and an oxidation gas,
the fuel cell system comprising:
a water-in-cell content adjusting device programmed to adjust, when a generated voltage of the fuel cell stack declines, a water-in-cell content of the fuel cell stack based on a characteristic curve of the water-in-cell content of the fuel cell stack and the cell pressure loss of the fuel cell stack, wherein
the water-in-cell content adjusting device programmed to adjust the water-in-cell content of the fuel cell stack so that an average water-in-cell content of the fuel cell stack falls within a stable section in which the cell pressure loss varies moderately relative to a steep section with respect to the water-in-cell content on the characteristic curve.

2. The fuel cell system according to claim 1, wherein in a case where the characteristic curve includes a transition from a stable section, in which the cell pressure loss of the fuel cell stack increases relatively moderately, to a steep increase section, in which the cell pressure loss of the fuel cell stack increases relatively steeply, with respect to an increase in the water-in-cell content of the fuel cell stack, the water-in-cell content adjusting device programmed to adjust the water-in-cell content of the fuel cell stack to be decreased when the generated voltage of the fuel cell stack declines.

3. The fuel cell system according to claim 1, wherein in a case where the characteristic curve includes a transition from a stable section, in which the cell pressure loss of the fuel cell stack decreases relatively moderately, to a steep decrease section, in which the cell pressure loss of the fuel cell stack decreases relatively steeply, with respect to a decrease in the water-in-cell content of the fuel cell stack, the water-in-cell content adjusting device programmed to adjust the water-in-cell content of the fuel cell stack to be increased when the generated voltage of the fuel cell stack declines.

4. The fuel cell system according to claim 1, wherein in a case where the characteristic curve includes a transition from a stable section, in which the cell pressure loss of the fuel cell stack increases relatively moderately to a steep increase section, in which the cell pressure loss of the fuel cell stack increases relatively steeply, with respect to an increase in the water-in-cell content of the fuel cell stack and a transition from the stable section, in which the cell pressure loss of the fuel cell stack decreases relatively moderately to a steep decrease section, in which the cell pressure loss of the fuel cell stack decreases relatively steeply, with respect to a decrease in the water-in-cell content of the fuel cell stack, the water-in-cell content adjusting device adjusts, when the generated voltage of the fuel cell stack declines, the water-in-cell content of the fuel cell stack to be decreased if an average water-in-cell content of the fuel cell stack is in the stable section or the steep increase section and the water-in-cell content of the fuel cell stack is adjusted to increase if the average water-in-cell content of the fuel cell stack is in the steep decrease section.

5. The fuel cell system according to claim 1, wherein the adjustment of the water-in-cell content of the fuel cell stack is performed by at least one of the following: an adjustment of a purge volume of the fuel cell stack, an adjustment of a gas back pressure of the fuel cell stack, and an adjustment of a temperature of the fuel cell stack.

* * * * *